(12) United States Patent
Weeks

(10) Patent No.: US 6,755,660 B1
(45) Date of Patent: Jun. 29, 2004

(54) MANIPULATIVE TEACHING AID

(76) Inventor: Nancy R. McCune Weeks, 1202 Scarlett Rd., Weatherford, TX (US) 76087

( * ) Notice: Subject to any disclaimer, the term of this patent is extended or adjusted under 35 U.S.C. 154(b) by 0 days.

(21) Appl. No.: 10/005,443

(22) Filed: Dec. 5, 2001

(51) Int. Cl.⁷ .............................................. G09B 19/00
(52) U.S. Cl. ...................................... 434/260; 434/258
(58) Field of Search ................................ 434/256, 258, 434/259, 260, 236

(56) References Cited

U.S. PATENT DOCUMENTS

| | | | |
|---|---|---|---|
| 2,942,571 A | | 6/1960 | White |
| 2,972,820 A | | 2/1961 | Cano |
| 3,546,788 A | | 12/1970 | Drumm |
| 3,546,789 A | * | 12/1970 | Kushell ...................... 434/260 |
| 3,566,481 A | * | 3/1971 | Causer ........................ 434/260 |
| D221,658 S | * | 8/1971 | Gallagher ................... D19/62 |
| 3,638,334 A | * | 2/1972 | Malikowski ................ 434/260 |
| 3,997,982 A | | 12/1976 | Holland |
| 4,096,647 A | | 6/1978 | Barry |
| 4,222,124 A | * | 9/1980 | Hiranishi ......................... 2/93 |
| 4,349,197 A | | 9/1982 | Livick |
| 4,457,722 A | | 7/1984 | Housand |
| 4,637,798 A | * | 1/1987 | Maiden-Nesset ............ 434/191 |
| 4,661,072 A | * | 4/1987 | White .......................... 434/260 |
| 4,671,514 A | * | 6/1987 | Wilson-Diehl .............. 273/287 |
| 4,723,323 A | | 2/1988 | Wright, Jr. |
| D312,311 S | | 11/1990 | Cotton |
| 5,927,986 A | | 7/1999 | Schottland |
| 6,142,786 A | | 11/2000 | Culberson et al. |
| 6,151,715 A | * | 11/2000 | Doherty ............................ 2/48 |
| 6,199,504 B1 | | 3/2001 | Freeman |

* cited by examiner

Primary Examiner—Kurt Fernstrom
(74) Attorney, Agent, or Firm—Geoffrey A. Mantooth; L. Bruce Terry

(57) ABSTRACT

A teaching aid includes a cover for substantially covering a support stand, wherein the cover has an outer surface and an inner surface, and the inner surface is adapted to conform to the support stand. The support stand may be an ordinary safety cone. The cover may be made of heavy fabric. Manipulative teaching devices are connected to the outer surface for learning and developing manipulative skills. The manipulative teaching devices may be implemented with clothing fasteners, such as zippers, buttons, laces, snaps, hooks and eyes, and hook-and-loop fasteners.

9 Claims, 1 Drawing Sheet

MANIPULATIVE TEACHING AID

BACKGROUND OF THE INVENTION

1. Field of the Invention

The present invention relates to a teaching aid or a rehabilitation device having manipulative teaching devices for practicing and improving manipulative skills.

2. Description of the Prior Art

Dexterity may be defined as the readiness and grace in physical activity, skill and ease in using the hands. As they grow, children must acquire dexterity. Children with learning and/or physical disabilities work particularly hard on dexterity exercises. And in many instances, adults must reacquire dexterity after suffering from disease or injury.

In acquiring manual dexterity, manipulative teaching devices are often used. These manipulative teaching devices often resemble or consist of everyday objects that people in counter in day-to-day living. Common examples of manipulative teaching devices are found in the form of fasteners used in clothing, such as zippers, buttons, laces, snaps, hook and eye fasteners, and hook and loop fasteners. Through the actions of buttoning, zipping, and tying, children and patients may develop their manual dexterity.

Providing a suitable platform for manipulative teaching devices has its challenges. The platform must securely support the teaching device, it should be inexpensive and easy to move and store. And in the case of teaching children, the platform must be safe and comfortable to be close to. It is also advantageous if the platform to offers an opportunity for more than one child to participate in learning at the same time.

U.S. Pat. No. 4,349,197 to Livick discloses a matching game having a rotatable housing with cutouts and pegs on the exterior surfaces. This game does not solve the problem of teaching manual dexterity, and with the intricate, precisely fitting parts, it is expensive to manufacture. Additionally, it is not as safe for children as it could be if it did not have hard surfaces and sharp corners.

U.S. Pat. No. 4,457,722 to Housand discloses an educational toy in a rectangular planar base. The disadvantages of this educational toy include expense in manufacturing, hard sharp surfaces that may cause injury, and difficulty in standing the toy in front of a user for easier reach.

A similar apparatus is shown in U.S. Pat. No. 4,096,647 to Barry. Barry discloses a learn-to-dress manual having panels simulating garment dressing operations. One disadvantage of this device is that it does not have a stand for providing an upright presentation of the panels. Also, this device is limited to a single user. U.S. Pat. No. 3,546,788 to Drumm has similar disadvantages.

U.S. Pat. No. 6,142,786 to Culbertson, et al. discloses an apparatus for educating a special needs child about shapes and hardware. While this device stands, which provides an upright presentation, this device is made of hard materials that may cause injury, and the wide base is not conducive to placing the device between a child's legs for close positioning and a comfortable easy reach.

U.S. Pat. No. 2,972,820 to Cano discloses an educational training device having a plurality of different fastening means, such as common closure or securing means found on wearing apparel. The disadvantage of the Cano device is that it is not supported to provide better presentation of the fasteners.

U.S. Pat. No. 4,723,323 to Wright, Jr., U.S. Pat. No. 6,151,715 to Doherty, and U.S. Pat. No. 3,997,982 to Holland each discloses a training device that is worn by a person and manipulated by that same person, or a second person, such as a child. For a child, learning with a training device on their own body is more difficult than learning with the training device in front of the child. The disadvantage of each of these devices is that it requires a person to wear the device. In a classroom situation, persons to wear these devices may not be available, therefore these devices have the disadvantage of not being free standing.

Therefore, it should be apparent that a need exists for an improved manipulative teaching aid that is inexpensive to manufacture, safe for children, includes a sturdy stand that may be comfortably used close to the body, and offers multiple users access to manipulative teaching devices.

OBJECTS AND SUMMARY OF THE INVENTION

It is an object of the invention to provide an inexpensive manipulative teaching aid. It is another object of the invention to provide a manipulative teaching aid that is safe and comfortable for children. It is a further object of the invention to provide a manipulative teaching aid that is sturdy and free-standing, and that offers access to manipulative teaching devices for more than one person.

A teaching aid in accordance to the present invention includes a cover for substantially covering a support stand, wherein the cover has an outer surface and an inner surface, and the inner surface is adapted to conform to the support stand. The support stand may be an ordinary safety cone, or traffic cone. The cover may be made of heavy fabric. Manipulative teaching devices are connected to the outer surface for developing and learning manipulative skills. The manipulative teaching devices may be implemented with clothing fasteners, such as zippers, buttons, laces, snaps, hooks and eyes, and hook-and-loop fasteners.

DESCRIPTION OF THE PREFERRED EMBODIMENTS

Figure 1:
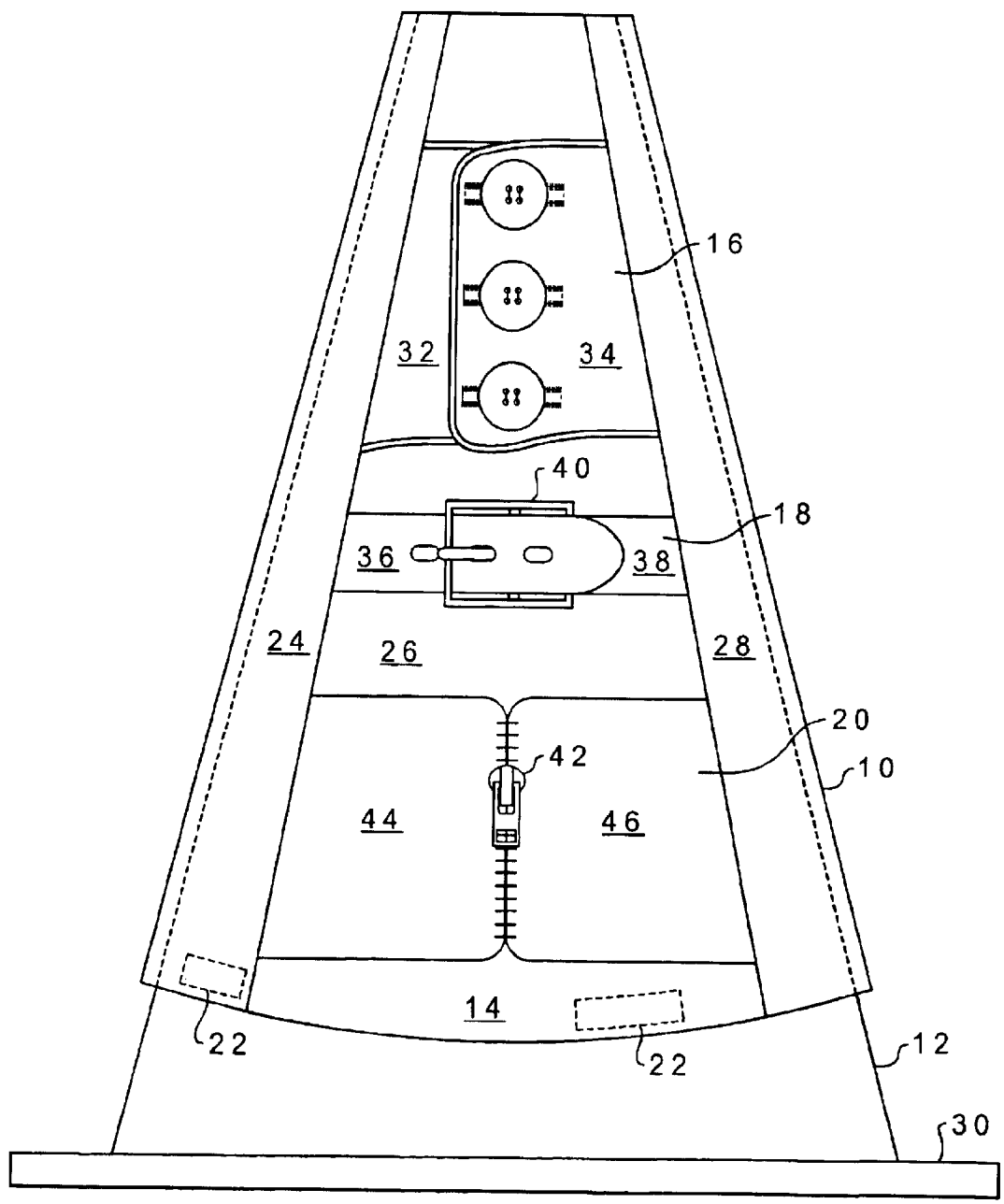
FIG. 1 is a side elevational view of a teaching aid covering a support stand in accordance with a preferred embodiment of the present invention.

With reference now to FIG. 1, there is depicted a side elevational view of a teaching aid covering a support stand in accordance with the present invention. As illustrated, cover 10 is covering and is supported by support stand 12. Cover 10 has an outer surface 14 and an inner surface (not shown in FIG. 1) that contacts support stand 12. In a preferred embodiment, the inter surface is adapted to conform to support stand 12 so that cover 10 is securely supported during teaching and rehabilitation activities. Outer surface 14 may have a different shape than support stand 12.

Preferably, cover 10 is made of a pliable material that will allow the inner surface to substantially conform to the contour of support stand 12. In a preferred embodiment, cover 10 is made of fabric. Heavy weight fabrics, such as denim or canvas, may provide better support for manipulative teaching devices 16, 18, and 20. Although a heavier fabric material is preferred, cover 10 may be made of plastic, rubber, foam padding, or similar materials, or combination of materials, that may be adapted to conform to the support stand.

In order to secure cover 10 to support stand 12 fasteners 22 may be placed at various locations on cover 10, and, if needed, corresponding locations on support stand 12, in order to removably secure cover 10 to support stand 12. In a preferred embodiment, fasteners 22 may be a hook-and-loop fastener, such as the hook-and-loop fastener sold under the name VELCRO®. In FIG. 1, fasteners 22 are hook-and-loop fasteners, and are shown, with hidden lines, on the inner surface of cover 10, and on support stand 12. Alternative fasteners 22 may include adhesive tape strips, snaps, buttons, elastic bands, or the like.

Cover 10 may be constructed of a single piece of material, or constructed of panels 24–28. As shown in FIG. 1, panels 24–28 are substantially triangular so that when they are assembled cover 10 is cone-shaped. By making cover 10 from panels 24, manipulative teaching devices 16 may be applied to each panel before panels 24–28 are assembled to form cover 10. Because panels 24–28 may be constructed simultaneously, the overall time needed to manufacture the teaching aid may be reduced.

As shown in FIG. 1, support stand 12 may include base 30 for added stability. Support stand 12 preferably has rounded edges and is constructed of a somewhat pliable material, such as plastic, in order to reduce the chance of injury from an impact with the stand. In a preferred embodiment, support stand 12 is a typical safety cone, which is used to warn of traffic hazards on the road. Such a safety cone does not have sharp edges, and is made of a plastic or rubber material that can be deformed, and thereafter return to its original shape. Such a material reduces the chance of injury if a child were to fall on support stand 12. Using a common, mass-produced item such as a safety cone also reduces the cost to manufacture the teaching aid.

Using a safety cone for support stand 12 also has another advantage; a child may place the safety cone support stand 12 between the child's legs so that manipulative teaching devices 16–20 are within close, comfortable reach, and as the child's legs wrap around support stand 12 and base 30 additional stability is added.

Although support stand 12 is shown in FIG. 1 as a safety cone, support stand 12 may be another shape, such as a pyramid shape, cylindrical, rectangular, or any other shape that will support manipulative teaching devices for use as a teaching aid.

With regard to the selection and design of manipulative teaching devices 16–20, manipulative teaching device 16 may be implemented with buttons sewn on fabric 32 and buttonholes in fabric 34.

In this embodiment, manipulative teaching device 16 is connected to the outer surface 14 of cover 10 by sewing one edge of each of fabric 32 and fabric 34 to outer surface 14. Other means of connecting may be used, such as gluing, stapling, riveting, heat bonding, or the like.

Similarly, manipulative teaching device 18 may be implemented with belt 36 having holes, and belt 38 having buckle 40.

Manipulative teaching device 20 may be implemented with zipper 42 installed between fabric 44 and fabric 46 for making a zipper connection between fabric 44 and fabric 46.

While the teaching aid of the present invention is shown in FIG. 1 with buttons, buckles and a zipper, other common clothing fasteners may be is used, such as laces, hook-and-loop fasteners, snaps, and the like. In addition to clothing fasteners, other manipulative teaching devices may be also connected to outer surface 14. Such other devices may include knobs, switches, beads, writing instruments, and other such devices to teach manual dexterity.

The teaching aid shown in FIG. 1 has the advantage of being safe for use around small children. When cover 10 is made of a soft material and support stand 12 is implemented with a safety cone, the teaching aid of the present invention offers stable support with no sharp edges, and a pliable, forgiving construction. When a safety cone is used for support stand 12, the safety cone may be placed within close reach, between a child's legs, for a convenient and comfortable reach. The circular design of the safety cone allows many manipulative teaching devices 16 to be placed on all sides of cover 10. When more than one side includes manipulative teaching devices, two or more people may use the teaching aid at one time.

The foregoing description of a preferred embodiment of the invention has been present for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A teaching aid comprising:
   an inanimate support stand;
   a cover supported on the support stand, wherein the cover has an outer surface and an inner surface, and the inner surface is adapted to conform to the support stand;
   at least one manipulative teaching device connected to the outer surface for developing manipulative skills;
   the support stand being a safety cone.

2. The teaching aid according to claim 1 wherein the cover is cloth.

3. The teaching aid according to claim 2 wherein the cloth cover comprises a plurality of cloth panels joined together.

4. The teaching aid according to claim 3 wherein the plurality of cloth panels joined together includes a plurality of triangular cloth panels joined to form a conical inner surface.

5. The teaching aid according to claim 1 wherein the manipulative teaching device is a clothing fastener.

6. The teaching aid according to claim 5 wherein the clothing fastener is a zipper.

7. The teaching aid according to claim 5 wherein the clothing fastener is a button and button hole.

8. The teaching aid according to claim 1 further comprising a fastener located on the cover inner surface for coupling the cover to the support stand.

9. The teaching aid according to claim 1 wherein the safety cone is of circular design.

* * * * *